(12) United States Patent
Spariosu et al.

(10) Patent No.: US 7,046,710 B2
(45) Date of Patent: May 16, 2006

(54) GAIN BOOST WITH SYNCHRONIZED MULTIPLE WAVELENGTH PUMPING IN A SOLID-STATE LASER

(75) Inventors: Kalin Spariosu, Thousand Oaks, CA (US); Milton Birnbaum, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 341 days.

(21) Appl. No.: 10/650,446

(22) Filed: Aug. 28, 2003

(65) Prior Publication Data

US 2005/0047466 A1    Mar. 3, 2005

(51) Int. Cl.
  *H01S 3/97*  (2006.01)
  *H01S 3/92*  (2006.01)

(52) U.S. Cl. ............................. 372/70; 372/5; 372/10; 372/39; 372/69

(58) Field of Classification Search .................... 372/5, 372/10, 39 M, 40, 69, 70, 74; 359/341–345
See application file for complete search history.

(56) References Cited

U.S. PATENT DOCUMENTS

| | | | |
|---|---|---|---|
| 4,477,906 A * | 10/1984 | Case ............................ | 372/41 |
| 4,585,944 A * | 4/1986 | Teraoka .................... | 250/484.4 |
| 5,247,529 A * | 9/1993 | Heidemann .................. | 372/23 |
| 5,426,656 A * | 6/1995 | Tohmon et al. ............... | 372/39 |
| 5,594,747 A * | 1/1997 | Ball ............................ | 372/31 |
| 6,002,697 A * | 12/1999 | Govorkov et al. ............ | 372/34 |
| 6,028,977 A | 2/2000 | Newsome et al. | |
| 6,278,719 B1 * | 8/2001 | Ohishi et al. .................. | 372/6 |
| 6,407,853 B1 * | 6/2002 | Samson et al. ........ | 359/341.31 |

(Continued)

FOREIGN PATENT DOCUMENTS

EP    1 039 593    9/2000

OTHER PUBLICATIONS

Nikolov, S. et al.: "Diode Pumped Erbium Lasers at 1.55 'mu!m and 1.64 'mu!m in single frequency operation" Proceedings of the Spie—The International Society for Optical Engineering SPIE-INT. Soc. Opt. Eng USA, vol. 2772, 1996, pp. 78–84, XP002324720, ISSN: 0277-786X.

(Continued)

*Primary Examiner*—Min Sun Harvey
*Assistant Examiner*—Delma R. Flores-Ruiz
(74) *Attorney, Agent, or Firm*—John E. Gunther; Leonard A. Alkov

(57) ABSTRACT

A solid-state eye-safe laser and method with gain boost by dual-wavelength, synchronized pumplights. The laser includes a medium doped with ions that emit light at a laser wavelength as a result of the transition of electron energy from an upper energy level manifold to a lower energy level manifold. A first pumplight couples energy into the medium at a first wavelength that excites a first portion of the ions into said upper energy level manifold. A second pumplight couples energy into said medium at a second wavelength that excites a second portion of the ions to a third energy level manifold. A fraction of the ions relax to the upper energy level manifold and thereby increase the gain of the laser (2). The laser may be an erbium crystal laser, using yttrium-aluminum-garnet operating near 1640 nanometers. A second ion, such as ytterbium, may be diffused into the lasing medium, and an inter-ionic energy transfer employed to coupled the second pumplight energy to the upper level energy manifold of he laser transition.

56 Claims, 10 Drawing Sheets

U.S. PATENT DOCUMENTS 6,810,052 B1 * 10/2004 Chicklis et al. ............... 372/39
6,891,878 B1 * 5/2005 Spariosu et al. ............. 372/70
2004/0240488 A1 * 12/2004 Okada et al. .................. 372/6

OTHER PUBLICATIONS

Kaczmarek, F. et al.: "Kinectics of Er<3+>-doped fluorozirconate optical fiber upconversion fluorescence and laser emission under 800 nm—excitation" Applied Physics B (Lasers and Optics) Springer-Verlag Germany, vol. 873, No. 2, Aug. 2001, pp. 125-128, XP002324721.

Ruikun Wu et al.: "Characteristics of Diode-Pumping Erbium Ytterbium-Doped Glass Laser" Proceedings of the SPIE—The International Society for Optical Engineering SPIE-INT. Soc. Opt. Eng. USA, vol. 2986, 1997, pp. 16-18, XP0023024722, ISSN: 0277-786X.

T.Yanagisawa, K.Asake, K.Hamazu, and Y.Hirano, "11-mJ, 15 Hz single frequency diode-pumped Q-switched Er, Yb:phosphate glass laser", Optics Lett. 26(16), 1262-1264, (2001).

A. Levoshkin, A.Petrov, and J.E.Montagne, "High-efficiency diode-pumped Q-switched Yb:Er:glass laser", Optics Communications, 185, 399-405 (2000).

T.Schweizer, T.Jensen, E. Heumann, and G.Huber, "Spectroscopic poperties and diode pumped 1.6 mm performance in Yb-codoped Er:Y3A15O12 and Er:Y2SiO5", Optics Communications, 118, 557-561 (1995).

K. Spariosu, M. Birnbaum, and B. Viana, "Er3+:Y3A15O12 laser dynamics: effects of upconversion", J. Opt. Soc. Am. B, 11(5), 894-900, (1994).

K. Spariosu and M. Birnbaum, "Intracavity 1.549 mm pumped 1.634 mm Er:YAG Lasers at 300 K", IEEE J. Quantum Electron. 30(4), 1044-1049, (1994).

J. J. Degnan, "Theory of optimally coupled Q-switched laser", IEEE J. Quantum Electron. 25(2), 214-220, (1989).

J. J. Degnan, "Optimization of passively Q-switched laser", IEEE J. Quantum Electron. 31(11), 1890-1901.

* cited by examiner

GAIN BOOST WITH SYNCHRONIZED MULTIPLE WAVELENGTH PUMPING IN A SOLID-STATE LASER

BACKGROUND OF THE INVENTION

1. Field of the Invention

The present invention relates to lasers. More specifically, the present invention relates to ultra-short pulse-width solid-state lasers that operate in the eye-safe region of the spectrum.

2. Description of the Related Art

Solid-state lasers employ a doped-insulator lasing medium, which may be a crystal or glass material. The input power source to the lasing medium is pumplight energy, which is optically coupled into the medium. Solid-state lasers can be configured as amplifier stages or as laser resonators. The resonator variety are distinguished by the fact that they self-oscillate and do not require a laser beam input from another device. The pumplight energy in laser amplifiers and laser resonators (collectively "lasers") may be derived from high power light emitting diode arrays, other lasers, or other sources that are known to those skilled in the art. Pumplight energy is used to raise the energy level of dopant ions within the lasing medium. A lasing action occurs when the ionic energy returns to it base state and, in doing so, releases light energy at the laser beam wavelength.

Solid state lasers have been designed to operate at various wavelengths, with the infrared bands proving to be particularly useful. At any given wavelength, there is some level of beam energy, or fluence, that represents a threshold of damage to the human retina. The band of wavelengths from about 1.4 microns to 1.8 microns has been shown to require energy levels that are several orders of magnitude greater, as compared to other wavelengths, before the threshold of eye-damage is reached. In fact, this band has been deemed the "eye-safe" band by certain US government agencies. Thus, in operational environments where humans are present, eye-safe lasers are preferred because they are safer.

The demand for eye-safe lasers and laser resonators is increasing, as is the desire for greater output power levels in such devices. Of course, compact size, robustness, high efficiency, high beam quality, ultra-short pulse duration, and low cost are also desirable features in eye-safe lasers. Applications for such lasers include a variety of ground-based and airborne sensing applications requiring operation at large stand-off ranges, as well as LADAR, range finding and target identification functions. Power level demands for such devices are growing from the range of about 10 millijoules per pulse up to hundreds of millijoules per pulse. Pulse widths are desired to be under one nanosecond in Q-switched laser applications.

Prior art in eye-safe lasers employed in large standoff applications are typically neodymium ion doped yttrium-aluminum-garnet (as well as other crystal hosts) lasers that are shifted to the eye-safe band using an optical parametric oscillator. Referred to by those skilled in the art as an OPO-shifted Nd:YAG laser. However, in spite of these lasers' excellent efficiency, they are inherently bulky and cumbersome, as they typically require many pumplight diode bars to operate with an appreciable energy output. Furthermore, energy conversion based on the OPO shift is inherently inefficient and results in compromised beam quality. Direct eye-safe lasers based on erbium ions are also known, but utilize an ionic energy transfer between ytterbium ions and erbium ions, both diffused in a phosphate glass host. See generally T. Yanagisawa, K. Asaka, K. Hamazu, and Y. Hirano, "11-mJ, 15 Hz single frequency diode-pumped Q-switched Er, Yb:phosphate glass laser", Optics Lett. 26(16), 1262–1264, (2001), and also see A. Levoshkin, A. Petrov, and J. E. Montagne, "High-efficiency diode-pumped Q-switched Yb:Er:glass laser", Optics Communications, 185, 399–405 (2000). One problem with this approach is that the glass host is severely limited by its poor thermal properties such that operating these lasers at higher average powers is prohibited. Prior art attempts to reproduce the ytterbium-erbium ionic energy transfer pumping process in a crystal host, such as YAG and others, have resulted in severely limited laser performance as indicated in T. Schweizer, T. Jensen, E. Heumann, and G. Huber, "Spectroscopic properties and diode pumped 1.6 µm performance in Yb-codoped Er:Y$_3$Al$_5$O$_{12}$ and Er:Y$_2$SiO$_5$", Optics Communications, 118, 557–561 (1995). This is due to the fact that unlike phosphate glass, the energy level dynamics of erbium in a crystal host is much less favorable as compared to glass.

The implementation of a direct resonant pumping of an erbium ion doped YAG ("Er:YAG"), and other crystal hosts, has been proven to be reasonably efficient, as was reported in K. Spariosu, M. Birnbaum, and B. Viana, "Er$^{3+}$:Y$_3$Al$_5$O$_{12}$ laser dynamics: effects of upconversion", J. Opt. Soc. Am. B, 11(5), 894–900, (1994), and in K. Spariosu and M. Birnbaum, "Intracavity 1.549 µm pumped 1634 µm Er:YAG Lasers at 300 K", IEEE J. Quantum Electron. 30(4), 1044–1049, (1994). However, like the resonantly pumped ytterbium laser, which is an inherently efficient system, the resonantly pumped erbium laser suffers from limited inversion density governed by the Stark splitting of the lower laser level manifold, typically the ground state of the ions. Therefore, in order to achieve ultra-short pulse-width Q-switched operation, it is necessary to devise a technique for implementing additional gain boost for optimizing this action. Thus, there is a need in the art for a technique to efficiently achieve additional gain boost in an Er:Crystal laser.

SUMMARY OF THE INVENTION

The need in the art is addressed by the apparatus and methods of the present invention. A laser is taught herein that includes a medium doped with first ions that emit light at a laser wavelength as a result of the transition of electron energy from an upper energy level manifold to a lower energy level manifold. The laser is driven by a first pumplight that is aligned to couple energy into the medium at a first wavelength that excites a first portion of the first ions into the upper energy level manifold. It is also driven by a second pumplight that is aligned to couple energy into the medium at a second wavelength that excites a second portion of the first ions to a third energy level manifold. A fraction of the second ions at the third energy level manifold relaxes to the upper energy level manifold. This action results in a gain boost from the increase in the total quantity of the first ions that are at the upper energy level manifold, and this increases the energy emitted at the laser wavelength.

In specific embodiments of the invention, the medium may be a crystal selected from one of: Sc$_2$SiO$_7$; Sc$_2$SiO$_5$; Y$_2$SiO$_5$; Ca$_2$Al$_2$SiO$_7$; Ca$_2$Ga$_2$SiO$_5$; YVO$_4$, BeAl$_2$O$_4$, and similar materials (including glasses). In a particular embodiment the crystal is yttrium-aluminum-garnet. In one embodiment, the first ions are erbium ions. Accordingly, the lower energy level manifold is the erbium $^4I_{15/2}$ manifold, the upper energy level manifold is the erbium $^4I_{13/2}$ manifold, and the third energy level manifold is the erbium $^4I_{11/2}$ manifold. Further, the first wavelength is near 1540 nm, the second wavelength is near 980 nm, and the laser wavelength is near 1640 nm. In a specific embodiment of the present invention, first pumplight is a light emitting diode array and the second pumplight is a erbium:fiber laser that emits energy at a wavelength near 980 nanometers. So as to enable a pulsed mode of operation of the laser, the laser may include a Q-switch disposed at an end of the medium through which the emitted laser wavelength light exits the medium.

In a refinement of the foregoing invention, the energy coupled from the first pumplight and the second pumplight are synchronized in time. The arrangement may be such that the first pumplight and the second pumplight energy coupling are synchronized such that they do not overlap in time. In a specific embodiment, the first pumplight couples energy at the first wavelength for approximately four milliseconds, and the second pumplight subsequently couples energy at the second wavelength for approximately two milliseconds.

In another embodiment of the present invention, the laser further includes second ions doped into the medium. Then, the second wavelength energy indirectly excites the second portion of the first ions by directly exciting a portion of the second ions to an increased energy level manifold that induces an inter-ionic energy transfer to the second portion of the first ions. In a specific embodiment, the first ions are erbium ions and the second ions are ytterbium ions. Accordingly, the increased energy level manifold is the ytterbium $^2F_{5/2}$ manifold, the lower energy level manifold is the erbium $^4I_{15/2}$ manifold, the upper energy level manifold is the erbium $^4I_{13/2}$ manifold, and the third energy level manifold is the erbium $^4I_{1/2}$ manifold. This results in the first pump wavelength being near 1540 nm, the second pump wavelength being near 940 nm and the laser output wavelength being near 1640 nm.

An illustrative embodiment of the present invention teaches a laser with a medium formed from erbium ion doped yttrium-aluminum-garnet. This medium emits laser light near 1640 nanometer wavelength as a result of the transition of electron energy from the erbium ion $^4I_{13/2}$ energy level manifold to the erbium ion $^4I_{15/2}$ energy level manifold. The laser includes a diode array pumplight aligned to couple energy near 1540 nanometer wavelength, for a first period of time that is approximately four milliseconds or less in duration, into the medium and thereby excite a first portion of the erbium ions into the erbium $^4I_{13/2}$ energy level manifold. Also, an erbium:fiber laser pumplight aligned to couple energy near 980 nanometers, for a subsequent period of time that is approximately two milliseconds or less in duration, into the medium and thereby excite a second portion of the erbium ions into the erbium ion $^4I_{11/2}$ energy level manifold. A fraction of these ions relax to the erbium ion $^4I_{13/2}$ energy level manifold and thereby increase the total quantity of the erbium ions at the $^4I_{13/2}$ manifold. Finally, a Q-switch is disposed at an end of the medium through which the emitted laser wavelength light exits the medium.

Another illustrative embodiment of the present invention teaches a laser with a medium formed from erbium ion and ytterbium ion doped yttrium-aluminum-garnet. This laser emits laser light near 1640 nanometer wavelength as a result of the transition of electron energy from the erbium ion $^4I_{13/2}$ energy level manifold to the erbium ion $^4I_{15/2}$ energy level manifold. The laser also includes a first diode array pumplight aligned to couple energy near 1540 nanometer wavelength, for a first period of time that is approximately four milliseconds or less in duration, into the medium. This coupling of energy excites a first portion of the erbium ions into the erbium $^4I_{13/2}$ energy level manifold. The laser also includes a second diode array pumplight aligned to couple energy near 940 nanometers, for a subsequent period of time that is approximately two milliseconds in duration, into the medium. This second coupling of energy excites a portion of the ytterbium ions into the ytterbium $^2F_{5/2}$ energy level manifold, which induces an inter-ionic energy transfer to the erbium ion $^4I_{11/2}$ manifold. As a result, a fraction of ions relaxes to the erbium ion $^4I_{13/2}$ energy level manifold and thereby increase the total quantity of the erbium ions at the $^4I_{13/2}$ manifold. Finally, the laser includes a Q-switch disposed at an end of the medium through which the emitted laser wavelength light exits the medium.

The present invention also teaches a method of producing laser light. The method occurs using a laser that has a medium doped with first ions that emit light at a laser wavelength as a result of the transition of electron energy from an upper energy level manifold to a lower energy level manifold. The laser also has a first pumplight operable to output energy at a first wavelength, and a second pumplight operable to output energy at a second wavelength. The steps of the method include coupling energy at the first wavelength from the first pumplight into the medium, thereby exciting a first portion of the first ions into the upper energy level manifold. Then, coupling energy at the second wavelength from the second pumplight into the medium, thereby exciting a second portion of the first ions to a third energy level manifold. This causes a fraction of the ions to relax to the upper energy level manifold, thereby increasing the total quantity of the first ions at the upper energy level manifold. This results in an increase in the energy emitted at the laser wavelength.

The method may be practiced in a laser with a crystal medium, which may be yttrium-aluminum-garnet. In a specific embodiment, the first ions are erbium ions, and the lower energy level manifold is the erbium $^4I_{15/2}$ manifold, the upper energy level manifold is the erbium $^4I_{13/2}$ manifold, and the third energy level manifold is the erbium $^4I_{11/2}$ manifold. As a result, the first wavelength is near 1540 nm, the second wavelength is near 980 nm, and the laser wavelength is near 1640 nm. The laser may employ a first pumplight that is a light emitting diode array and a second pumplight that is an erbium:fiber laser that emits energy at a wavelength near 980 nanometers. Also, the laser may further include a Q-switch disposed at an end of the medium, then further include the step of emitting the laser light through the Q-switch upon reaching the switching threshold of the Q-switch, thereby emitting a short pulse of laser light.

In a specific embodiment of the method, the further step of synchronizing the coupling of energy from the first pumplight and the second pumplight is added. In a refinement, the synchronizing step is accomplished such that the coupling of the first pumplight energy and the second pumplight energy do not overlap in time. In particular, the first pumplight may couple energy at the first wavelength for approximately four milliseconds, and the second pumplight may subsequently couple energy at the second wavelength for approximately two milliseconds.

In another embodiment of the method, second ions are doped into the medium. The method includes the further step of indirectly exciting the second portion of the first ions by directly exciting a portion of the second ions to an increased energy level manifold. This induces an inter-ionic energy transfer to the second portion of the first ions. In a particular embodiment, the first ions are erbium ions and the second ions are ytterbium ions. Accordingly, the increased energy level manifold is the ytterbium $^2F_{5/2}$ manifold, the lower energy level manifold is the erbium $^4I_{15/2}$ manifold, the upper energy level manifold is the erbium $^4I_{13/2}$ manifold, and the third energy level manifold is the erbium $^4I_{11/2}$ manifold. Thus, the first wavelength is near 1540 nm, the second wavelength is near 940 nm and the laser wavelength is near 1640 nm.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches an inherently efficient direct eye-safe laser based on erbium crystal ("Er:Crystal") technology utilizing a dual pump scheme that is amenable to ultra-short pulse length Q-switched operation. The invention enables designers to implement high-energy short pulse width lasers that are also extremely compact and lightweight. As noted above, current state-of-the-art eye-safe lasers for airborne large-standoff applications employ OPO-shifted Nd:YAG technology. However, in spite of these lasers' excellent efficiency, they are inherently bulky and cumbersome as they require typically many diode array bars to operate with an appreciable energy output. Furthermore, energy conversion based on the OPO is inherently inefficient and results in compromised beam quality. Direct eye-safe lasers based on erbium ions are currently based on a ytterbium to erbium ion ("Yb-Er") energy transfer pumping mechanism within a phosphate glass host, as was noted hereinbefore. Glass hosts are severely limited by their poor thermal properties such that operating these lasers at higher average powers is prohibited. Attempts to reproduce the functional Yb-Er energy transfer pumping process in a crystal hosts (such as YAG as well as others) have resulted in a severly limited laser performance[3]. This is due to the fact that unlike in phosphate glass, the energy level dynamics of erbium in a crystal host is much less favorable as compared to glass.

Implementation of a direct resonant pumping of Er:YAG (and other crystal hosts) is known in the art[4,5]. However, like the resonantly pumped ytterbium laser, which is an inherently efficient system, the resonantly pumped Er:Crystal laser suffers from limited inversion density governed by the Stark splitting of the lower laser level manifold. Therefore, in order to achieve ultra-short pulse width Q-switched operation, a technique for implementing greater gain boost, which is necessary for this action, is required. This invention describes a system and method for efficiently achieving the needed gain boost through application of a dual-wavelength, synchronized, pumping scheme.

Figure 1:
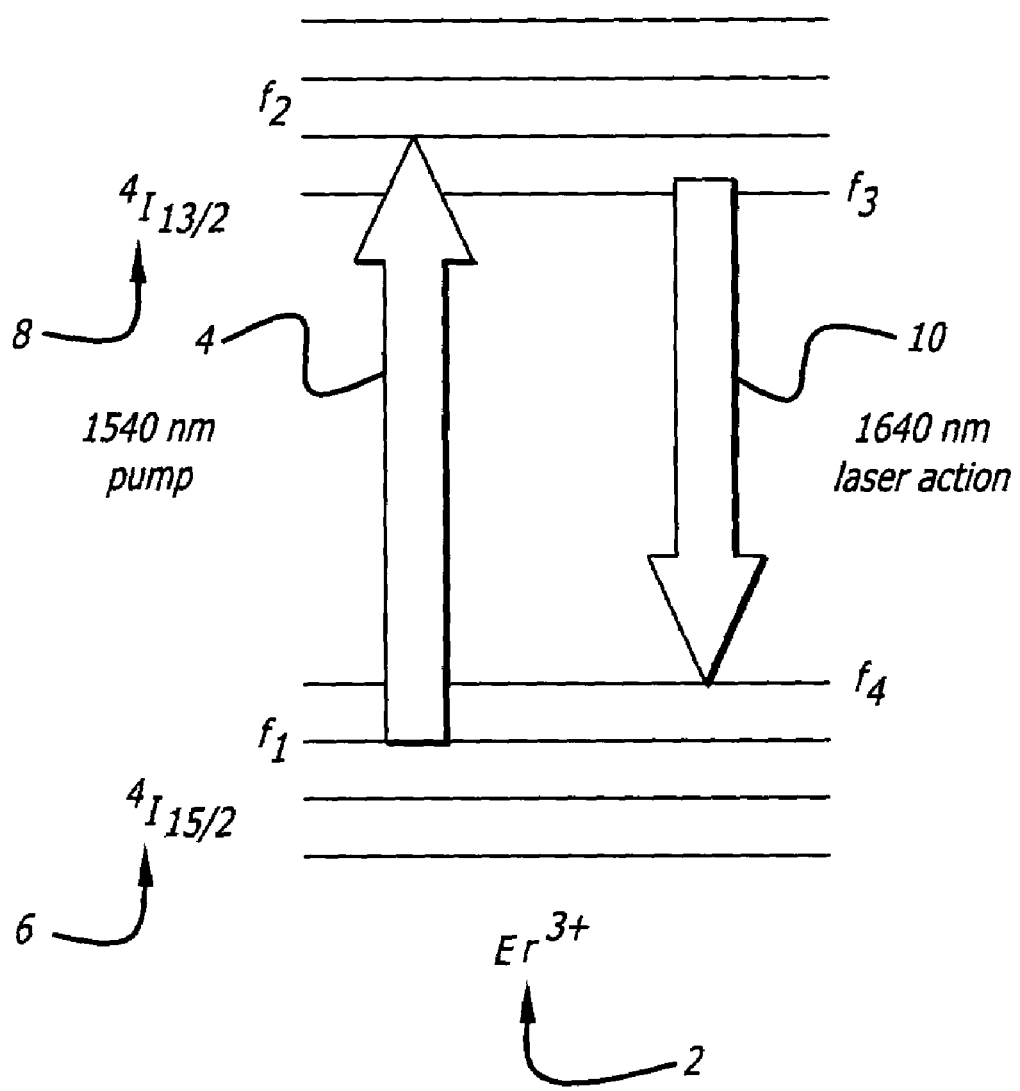
FIG. 1 is a prior art laser energy diagram.

The prior art includes rresonantly pumped Er:YAG lasers that have been demonstrated with slope efficiencies as high as fifty percent, as reported in K. Spariosu, M. Birnbaum, and B. Viana, "Er$^{3+}$:Y$_3$Al$_5$O$_{12}$ laser dynamics: effects of upconversion", J. Opt. Soc. Am. B, 11(5), 894–900, (1994). Resonantly pumped lasers are those where the pumplight energy directly excites the upper level energy manifold of the laser transition. Reference is direct to FIG. 1, which illustrates the pump scheme for a resonantly pumped Er:YAG laser. The erbium plus three ions 2 are diffused into the host YAG crystal. The lower level energy manifold of the laser transition is the erbium $^4I_{15/2}$ energy manifold 6, which is the ground state for the erbium ion. Pumplight energy 4 at 1540 nanometers is coupled into the Er:YAG medium, which excites a portion of the erbium ions to the upper level energy manifold of the laser transition, which is the $^4I_{13/2}$ manifold 8. The resultant laser action occurs as energy is released when the ions revert from the upper to the lower level energy manifolds of the laser transition, emitting 1640 nanometer photon energy 10. The pump energy 4 near 1540 nanometers is efficiently converted to Er:YAG laser output in the 1550 to 1650 nanometer range 10. This pumping scheme boasts high efficiency; low up-conversion losses since the pump is not accessing upper energy levels, and excellent thermal handling crucial to high power scaling scenarios due to a very small quantum defect. In such a device, the pump sources could be either a high efficiency diode-pumped erbium-fiber ("Er:Fiber") laser, or 1500 nanometer diode bar arrays.

Again considering FIG. 1, the Er:Crystal laser dynamics showing the Stark sub-levels will be discussed. The population densities of the lower and upper laser levels are $N_L$ and $N_U$ respectively where the total Er$^{3+}$ ion density is $N_T=N_L+N_U$. The fractional population that the pump accesses is $f_1\, N_L$. Similarly the population inversion is: $N=f_3\, N_U-f_4\, N_L$. It can be shown that expressed in terms of the total ion density, the maximum population inversion that can be achieved with this type of pumping is:

$$N = \frac{f_1 f_3 - f_2 f_4}{f_1 + f_2}$$

The maximum inversion density in Er:YAG, for example, turns out to be about $0.1N_T$ for the pump wavelength of 1530 nanometers. For the pump wavelength of 1470 nanometers this maximum inversion density fraction can reach $0.15N_T$, however, at this wavelength up-conversion losses can be more pronounced as well as the quantum defect being less favorable. Therefore, especially in this scenario where a gain boost approach is utilized, the longer wavelength, near 1530 nanometers is preferred.

Figure 2:
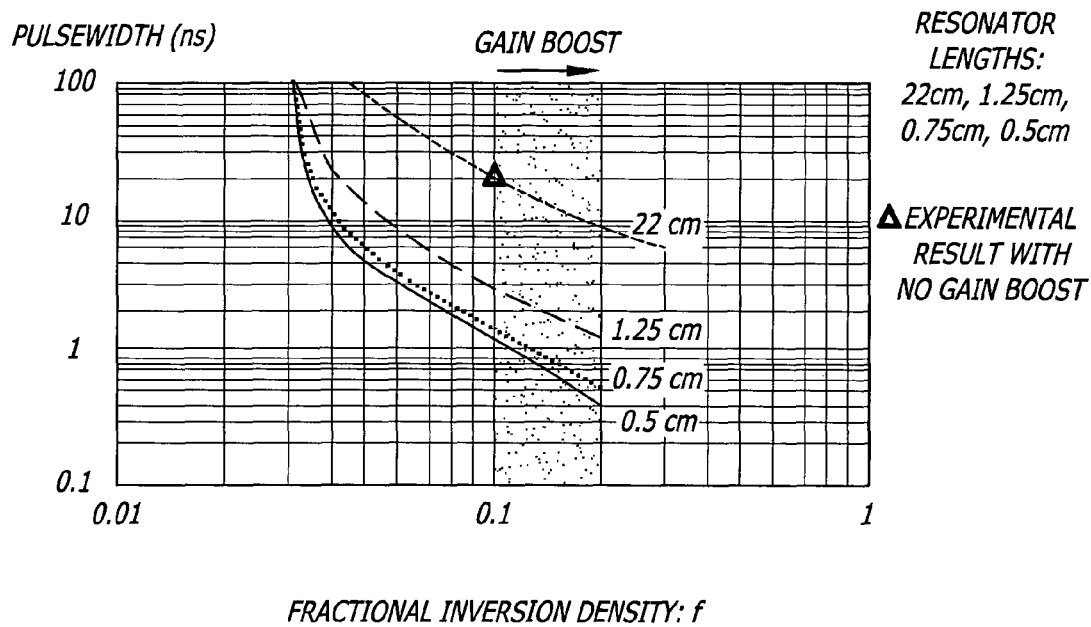
FIG. 2 is a prior art laser pulse width versus inversion density graph for various sized lasing media.

Although resonantly pumped Er:Crystal laser are relatively low-gain, they are actually ideal for large energy storage, efficient operation, and high power scaling because of the reasons discussed above. The Er:Crystal laser's main drawback, however, is it's limitation respecting ultra-short pulse Q-switched laser action. Those skilled in the art appreciate that value of ultra-short pulse duration lasers as they apply to real-world scenarios. Reference is directed to FIG. 2, which graphically illustrates the saturable absorber Q-switch pulse width laser model, where the fractional inversion density is selected as the function variable. The pulse width calculations shown in FIG. 2 were calculated using the relationship[6,7]:

$$t_p(z, l) := \frac{2 \cdot l \cdot n \cdot 10^9}{L \cdot c} \cdot \frac{\ln(z)}{z \cdot \left[1 - \frac{(z-1)}{z \cdot \ln(z)} \cdot \left[1 - \ln\left[\frac{(z-1)}{z \cdot \ln(z)}\right]\right]\right]}$$

Where l is the gain length, L is the resonator loss, c is the speed of light, n is the gain medium refractive index, and z is a normalized gain number. This relationship is articulated further in J. J. Degnan, "Theory of optimally coupled Q-switched laser", IEEE J. Quantum Electron. 25(2), 214–220, (1989), and also in J. J. Degnan, "Optimization of passively Q-switched laser", IEEE J. Quantum Electron. 31(11), 1890–1901, (1995). As can be noted there is excellent agreement with the one reported experimental result for Q-switched operation of Er:YAG (for no gain boost). In addition, this model shows that invoking a gain boost would allow for a significantly reduced Q-switched pulse width operation of this laser.

Figure 3:
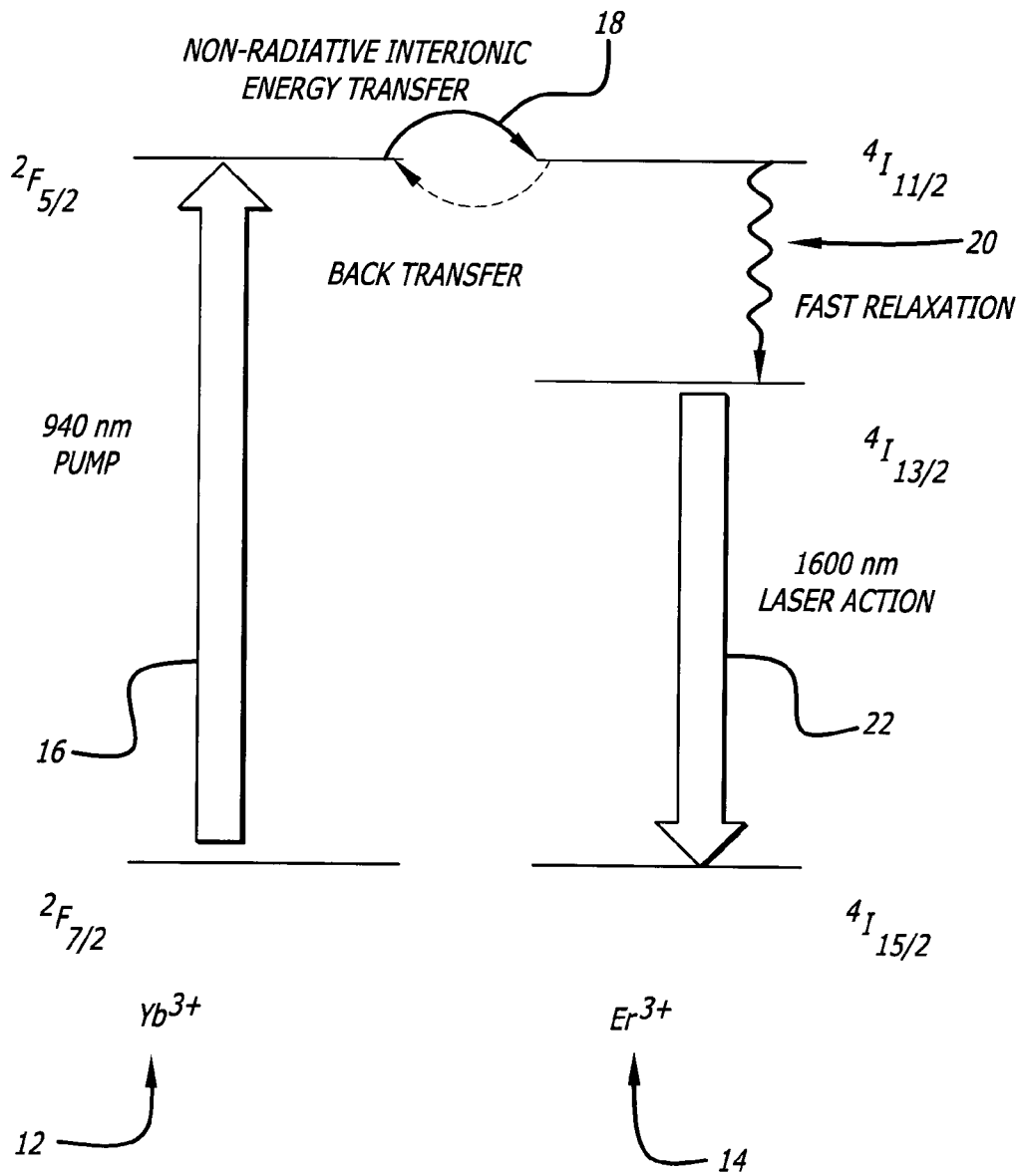
FIG. 3 is a prior art laser energy diagram.

In addition to direct resonant pumping in an Er:Crystal laser, those skilled in the art are familiar with pumping in a medium that employs two ions. Reference is directed to FIG. 3, which is a pump scheme diagram for a ytterbium-erbium crystal laser ("Yb,Er:Crystal"). A single crystal medium is doped with ytterbium plus three ions ("Yb") 12 and erbium plus three ions ("Er") 14. A pumplight source that emits energy 16 near 940 nanometers excites the Yb ions from the Yb $^2F_{7/2}$ manifold to the $^2F_{5/2}$ manifold. A non-radiative inter-ionic energy transfer 18 takes place between the Yb $^2F_{5/2}$ manifold and Er $^4I_{11/2}$ manifold. This transfer scheme is known to those skilled in the art. Once excited, the Er $^4I_{11/2}$ manifold naturally experiences a fast relaxation 20 to the $^4I_{13/2}$ manifold. Once this has occurred, the energy is available between the upper and lower laser transition energy manifolds so that laser emission 22 near 1600 nanometers can occur. Thus, the 940 nanometer pump 16 is an alternative available to designers for the 980 nanometer resonant pump discussed above.

Figure 4:
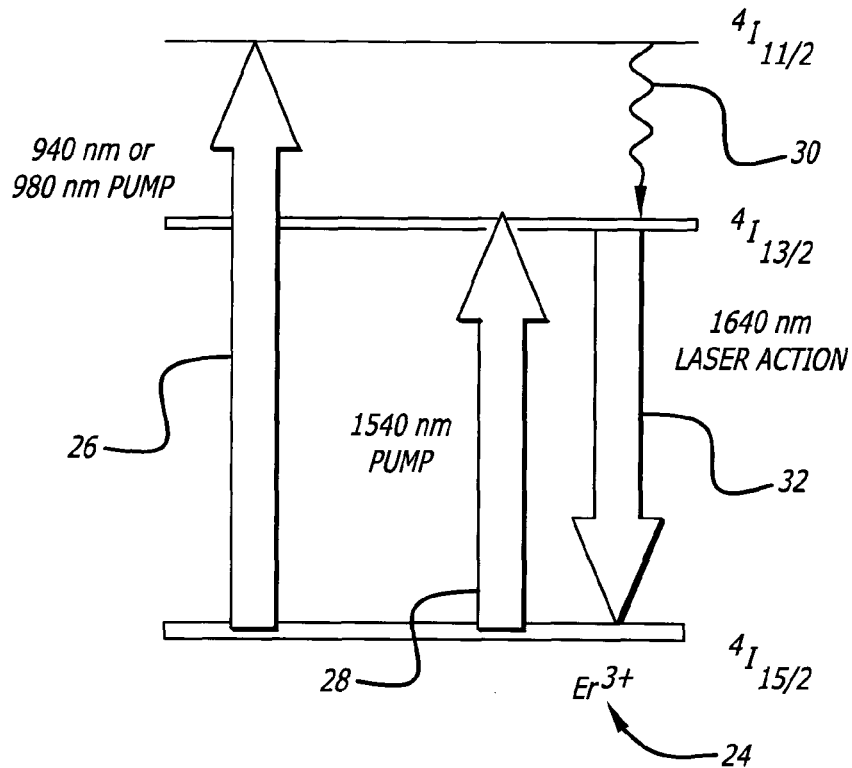
FIG. 4 is a laser energy diagram according to an illustrative embodiment of the present invention.

The gain boost approach taught by the present invention essentially involves the application of a properly synchronized dual-wavelength pumping scheme as illustrated in FIG. 4. Erbium ions 24 are dispersed into a crystal host, which may be YAG. The excitation of the $^4I_{11/2}$ Er energy level 26 can be achieved either via the Yb-Er energy transfer with a 940 nanometer source in an appropriately co-doped Yb-Er:Crystal, or via directly pumping the $^4I_{11/2}$ Er level with a 980 nanometer source. The Yb-Er approach is advantageous in that it provides for a significantly higher absorption cross-section and broader spectral absorption peaks allowing some flexibility in the pumplight wavelength. The drawback to this approach is the compromised energy transfer efficiency. Although the more common hosts such as YAG have exhibited this limitation in Yb-Er pumping mechanism, there are other promising hosts, such as $Y_2SiO_5$ (YSO), $Sc_2SiO_7$, $Sc_2SiO_5$, $Ca_2Al_2SiO_7$ (CAS), $Ca_2Ga_2SiO_5$ (CGS), $YVO_4$, $BeAl_2O_4$, and similar materials, in which this efficiency may be improved significantly.

The second approach of pumping directly into the Er $^4I_{11/2}$ level is advantageous in the sense that it is inherently more efficient since it does not rely on an indirect, inter-ionic, energy transfer mechanism. However, at the typical doping densities required for efficient eye-safe laser action in erbium, the absorption cross-section for the 980 nanometer pump is very low. Therefore, a technique to effectively increase the absorption length for the 980 nanometer is required in order to mitigate this shortcoming.

Continuing with respect to FIG. 4, the dual-wavelength pumping technique is essentially implemented as follows. Since the inherent advantage in efficiency and power scaling belongs to the resonant pumping wavelength near 1540 nanometer 28, most of the pump energy is delivered in this 1500 nanometer band over the typical significant fraction of the upper laser level fluorescence lifetime. Then at an optimized synchronization, a relatively shorter pump energy burst will be delivered at 940 nanometers or 980 nanometers 26 to excite ions to the $^4I_{11/2}$ level. These ions experience a fast relaxation 30 to the $^4I_{13/2}$ manifold thereby providing the needed gain boost beyond the 1540 nanometer pump 28. The result is increased power output 32 of the 1640 nanometer laser, as well as a shortening of the pulse duration in a Q-switched system. In this manner, efficient operation is still maintained while providing for a gain boost at the appropriate time in the inversion density evolution time-line.

Figure 5:
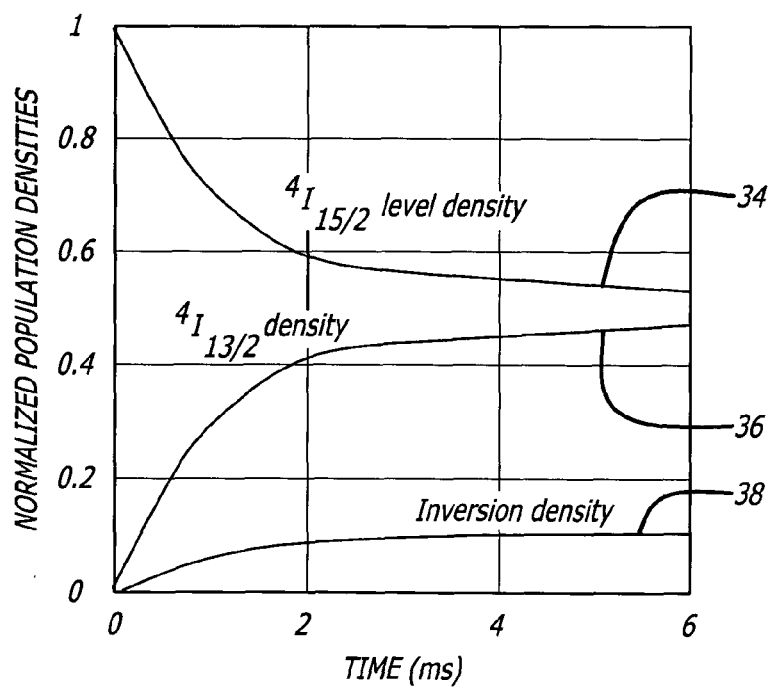
FIG. 5 is a prior art ion population density graph.

To more clearly illustrate this effect, the population and Q-switched pulse energy dynamics for the "standard" resonant pump only as well as for the gain boost pumping were calculated and plotted. The equation set includes:

$$\frac{\partial N_U}{\partial t} = R_P(f_1 N_L - f_2 N_U) - c\sigma_L \phi_L (f_3 N_U - f_4 N_L) - \frac{N_U}{\tau_U} + \frac{(N_T - N_U - N_L)}{\tau_S}$$

$$\frac{\partial N_L}{\partial t} = -R_P(f_1 N_L - f_2 N_U) + c\sigma_L \phi_L (f_3 N_U - f_4 N_L) + \frac{N_U}{\tau_U} - R_S(t) N_L$$

$$\frac{\partial \phi_L}{\partial t} = c\sigma_L \phi_L (f_3 N_U - f_4 N_L) \frac{l}{L} - \frac{\phi_L}{\tau_C} + S$$

Where the total population density is $N_T = N_L + N_U + N_S$. $\sigma_L$ is the stimulated emission cross-section, $\phi_L$ is the photon density, $\tau_U$ is the upper laser level lifetime, $\tau_C$ is the cavity photon lifetime, $\tau_S$ is the lifetime of the $^4I_{11/2}$ energy level, l is the gain length, L is the cavity length, $R_P$ is the 1500 nanometer pump rate and $R_S(t)$ is the 940 or 980 nanometer pump rate. The results of these calculations are plotted in FIG. 5 for the prior art resonant pumping scheme and in FIG. 6 for the present invention dual wavelength gain-boost pumping scheme. These Figures show the population dynamics for the resonantly pumped laser only in FIG. 5, and with the gain boost pumping in FIG. 6.

These results show a clear enhancement (almost doubling) of the population inversion density. The secondary pump at 940 or 980 nanometer is turned on 4 milliseconds after the onset of the 1500 nanometer pump and right after the 1500 nanometer is turned off, which is also at the 4 milliseconds time point. This is the most favorable pumping approach in the sense that both the 1500 nanometer and 940/980 nanometer pumps are utilized with an optimized efficiency. If the two pumps overlap in time, the 940/980 nanometer pump is to a certain extent competing with the 1500 nanometer pump which will tend to deplete available ions in the ground state manifold. However, if the two pumps are applied in a consecutive non-overlapped synchronization, both pumps will independently achieve the highest pumping efficiency, as well as achieving the synergetic goal of providing of a boosted inversion density with an effectively low-quantum defect, therefore inherently high efficiency. Note in FIG. 5 that the ground state population densities 34 decease as the mirror of the upper level energy manifold population density 36. The inversion density 38 does not exceed about ten percent, as expected. This performance is dramatically exceeded by utilizing the teachings of the present invention, as illustrated in the plots in FIG. 6.

Figure 6:
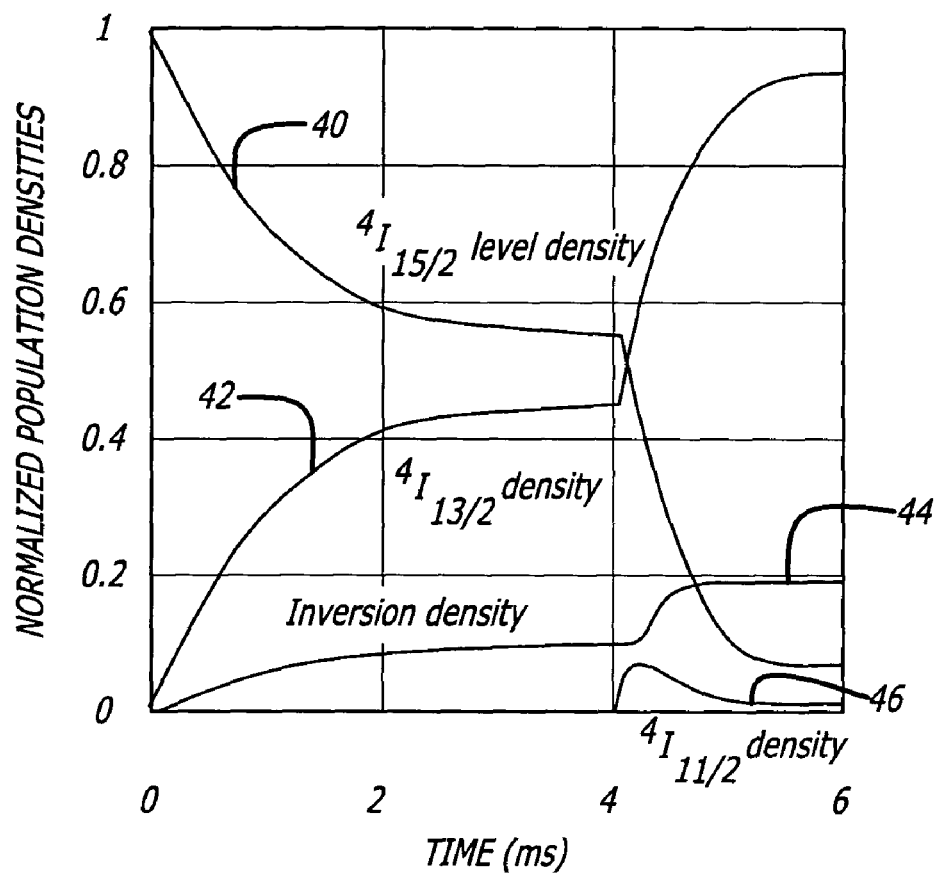
FIG. 6 is a population density graph according to an illustrative embodiment of the present invention.

In FIG. 6, the resonant 1540 nanometer pump is applied for the first four milliseconds and the ground state populations density 40, the upper level laser manifold population densities 42 and the inversion densities 44 perform as with the prior art, up to the four millisecond time. At that time, the second wavelength pump at 940/980 nanometers is applied. Note the dramatic boost in the $^4I_{13/2}$ density 42, which is populated by the fast relaxation of the $^4I_{11/2}$ density 46. The inversion density 44 then rises to nearly twenty percent.

Figure 7:
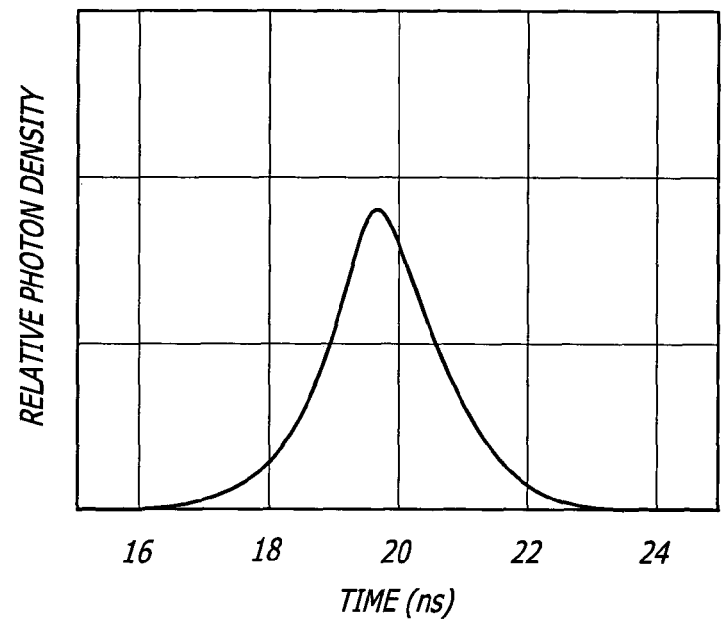
FIG. 7 is a prior art laser pulse timing chart.
Figure 8:
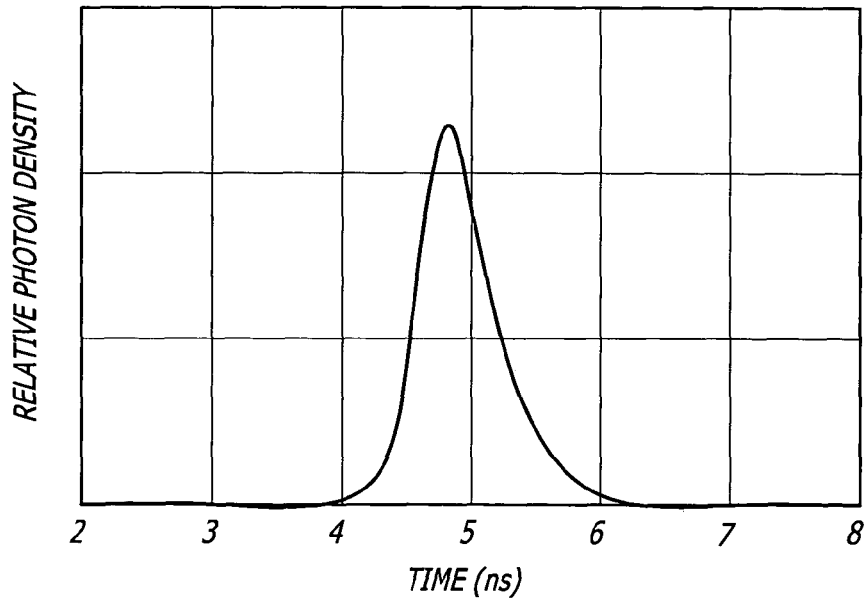
FIG. 8 is a laser pulse timing chart according to an illustrative embodiment of the present invention.

The resultant Q-switched pulse outputs also show a significant improvement in pulse width for identical conditions comparing the dual-wavelength gain boost versus resonant pumping only. Reference is directed to FIG. 7 showing a prior art resonant pumped output pulse and FIG. 8 showing an output pulse according to the present invention. These comparison cases were done with a one-centimeter long resonator comprising of one-centimeter long gain medium, an ideal short monolithic resonator, and fast Q-switched operation. Note that the peak values are not to scale in these Figures. Note that the gain-boosted pulse in FIG. 8 is about one nanosecond and less than half that of the resonant pumped pulse in FIG. 7.

Figure 9:
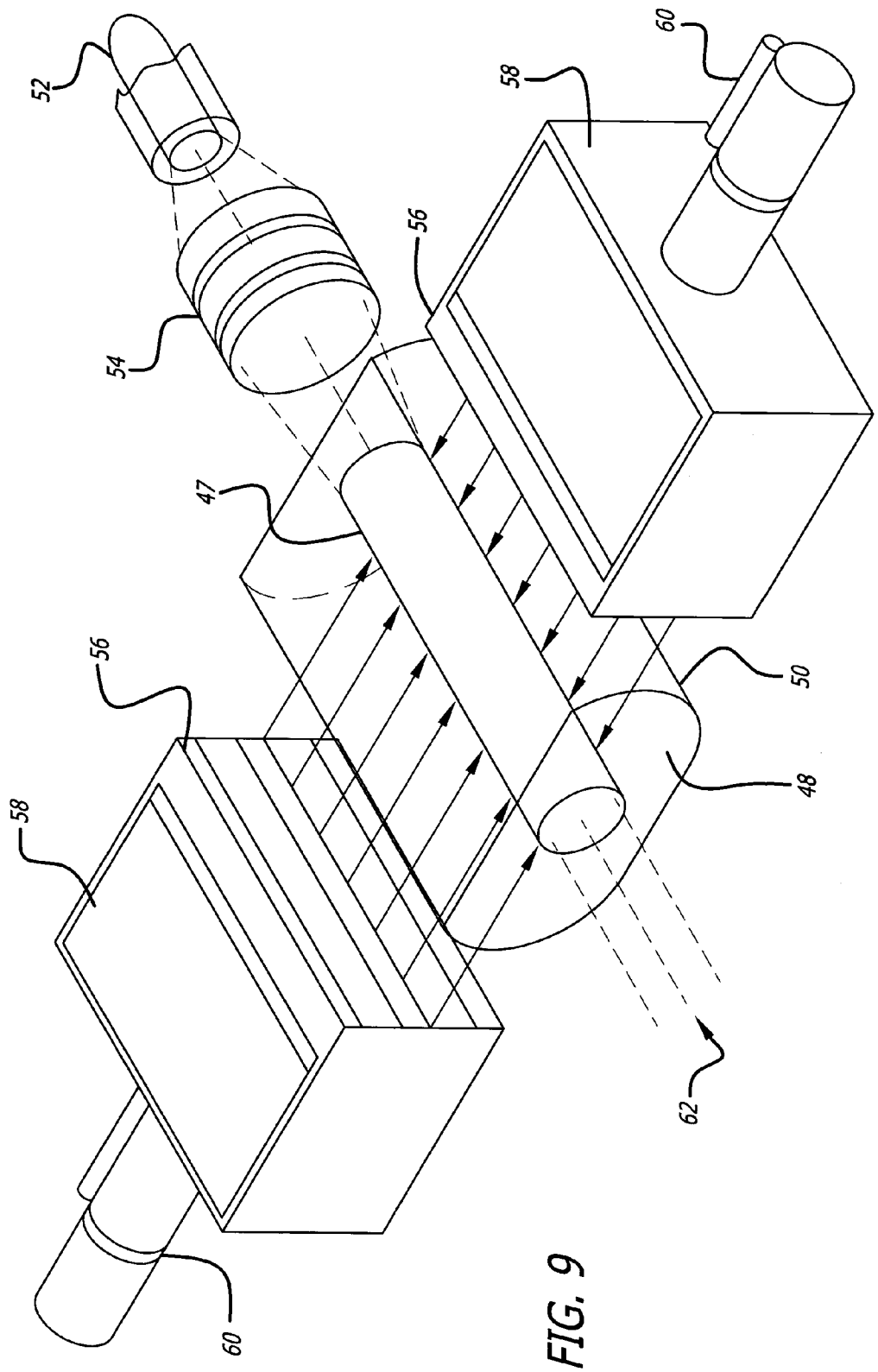
FIG. 9 is a perspective drawing of a laser according to an illustrative embodiment of the present invention.

The apparatus and method for a specific implementation of the present invention dual-wavelength gain-boost pumping depends on whether the 940 nanometer pump utilizing the Yb-Er energy transfer or 980 nanometer direct pumping of Er is chosen. In the case of a 940 nanometer pump, one configuration that can be utilized appears in FIG. 9. A 1500 nanometer Er:Fiber laser 52 is used as the resonant pump source, and it is coupled to the gain medium 47 with a lens 54. The gain medium 47 is Yb,Er:Crystal, The secondary pump is from a pair of 940 nanometer diode array bar pumplights 56, which are cooled with heat sinks 58 and cooling manifolds 60. The laser medium 47 is surrounded with an integrating pump cavity 50 and includes integral dielectric coating for transmissive and reflective beam management. A Q-switch 48 is disposed at the end of the gain medium 47 so as to enable pulsed operation of the laser. Ultimately, the 1600 nanometer laser beam 62 emerges from the laser when the Q-switch beaches. Q-switch operation is known to those skilled in the art.

Figure 10:
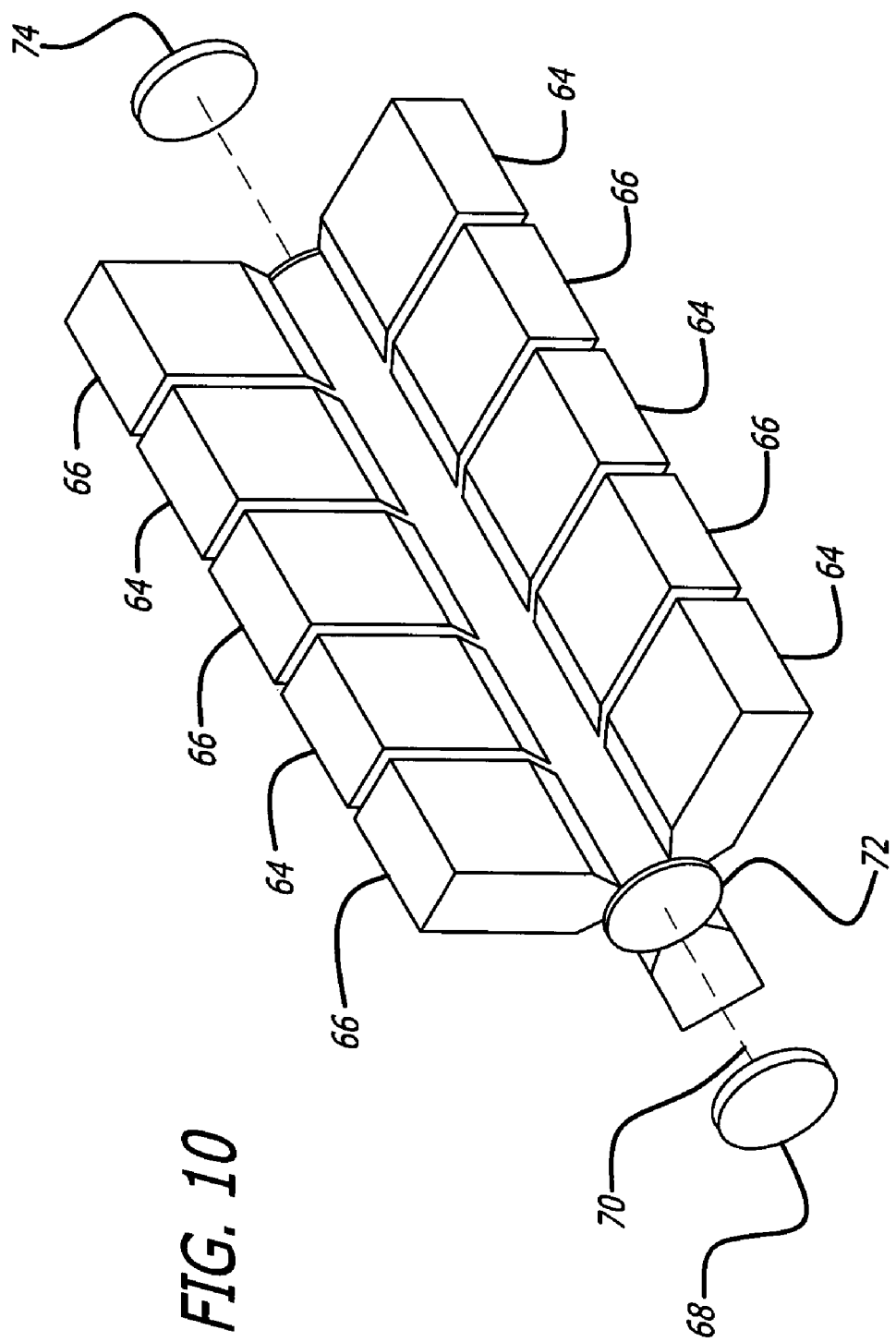
FIG. 10 is a perspective drawing of a laser according to an illustrative embodiment of the present invention.

Reference is directed to FIG. 10, which is a drawing of another illustrative embodiment Yb,Er:Crystal laser according to an illustrative embodiment of the present invention. A rod-shaped crystal lasing medium 72 is aligned with plural 940 nanometer diode pumplights 64, and with plural 1500 nanometer diode pumplights 66. The pumplights are interspersed about the lasing medium 72 both along its length and circumference in a symmetrical configuration. The laser beam 70 is retained by dielectric mirror 74 and Q-switch 68 until such time as the Q-switch 68 bleaches and the pulse of laser light is emitted from the lasing medium 72.

Figure 12:
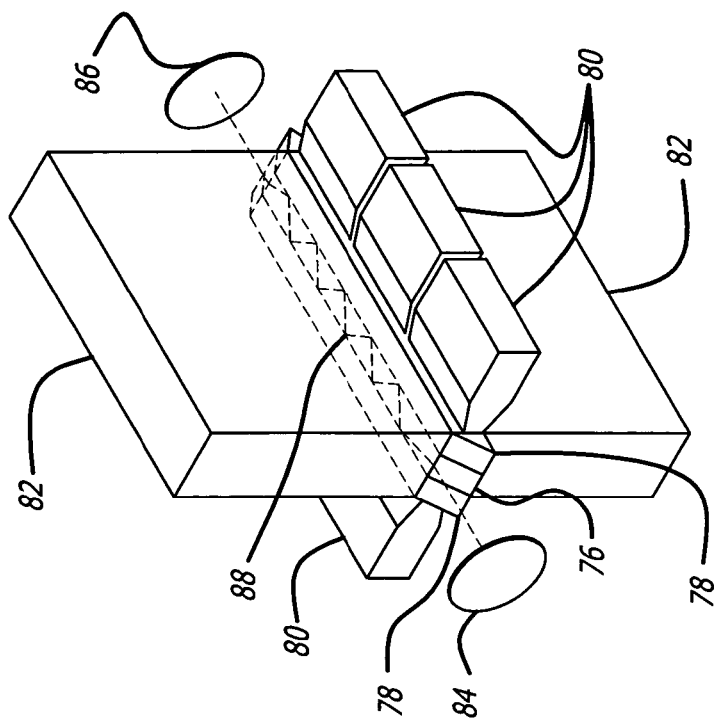
FIG. 12 is a perspective drawing of a laser according to an illustrative embodiment of the present invention.
Figure 11:
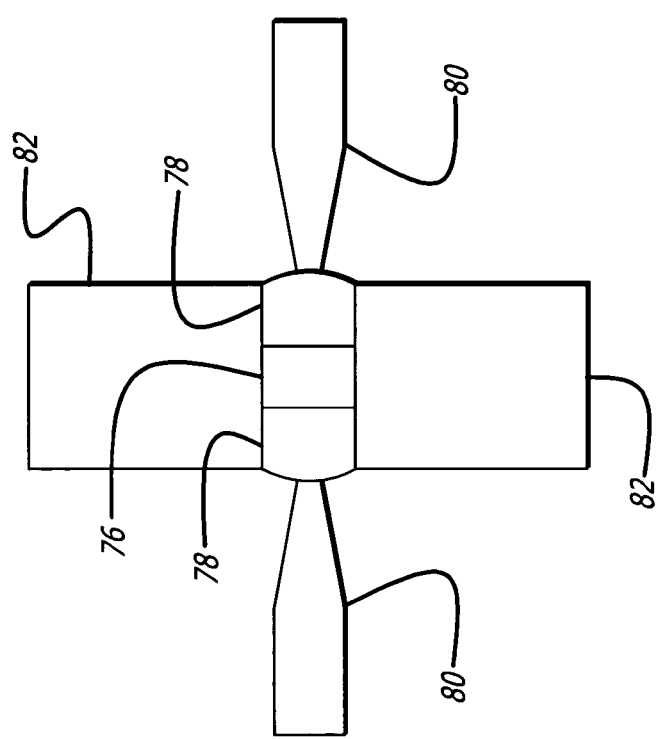
FIG. 11 is an end view drawing of a laser according to an illustrative embodiment of the present invention.

Reference is directed to FIG. 11 and FIG. 12 which are an end view and perspective view, respectively, of yet another implementation of an Yb,Er:Crystal laser according to an illustrative embodiment of the present invention. The lasing medium 76 is rectangular and is formed into a composite with non-doped crystal 78 on either side. 940 nanometer and 1500 nanometer diode array bars 80 are coupled to the sides of the lasing medium composite 76, 78. The light beam 88 within the lasing medium 76 follows a zigzag path. Heat sinks 82 cool the lasing medium slab 76. A dielectric mirror 86 and Q-switch 84 retain the light energy in the system until the Q-switch bleaches and the 1600 nanometer laser beam is emitted.

Figure 13:
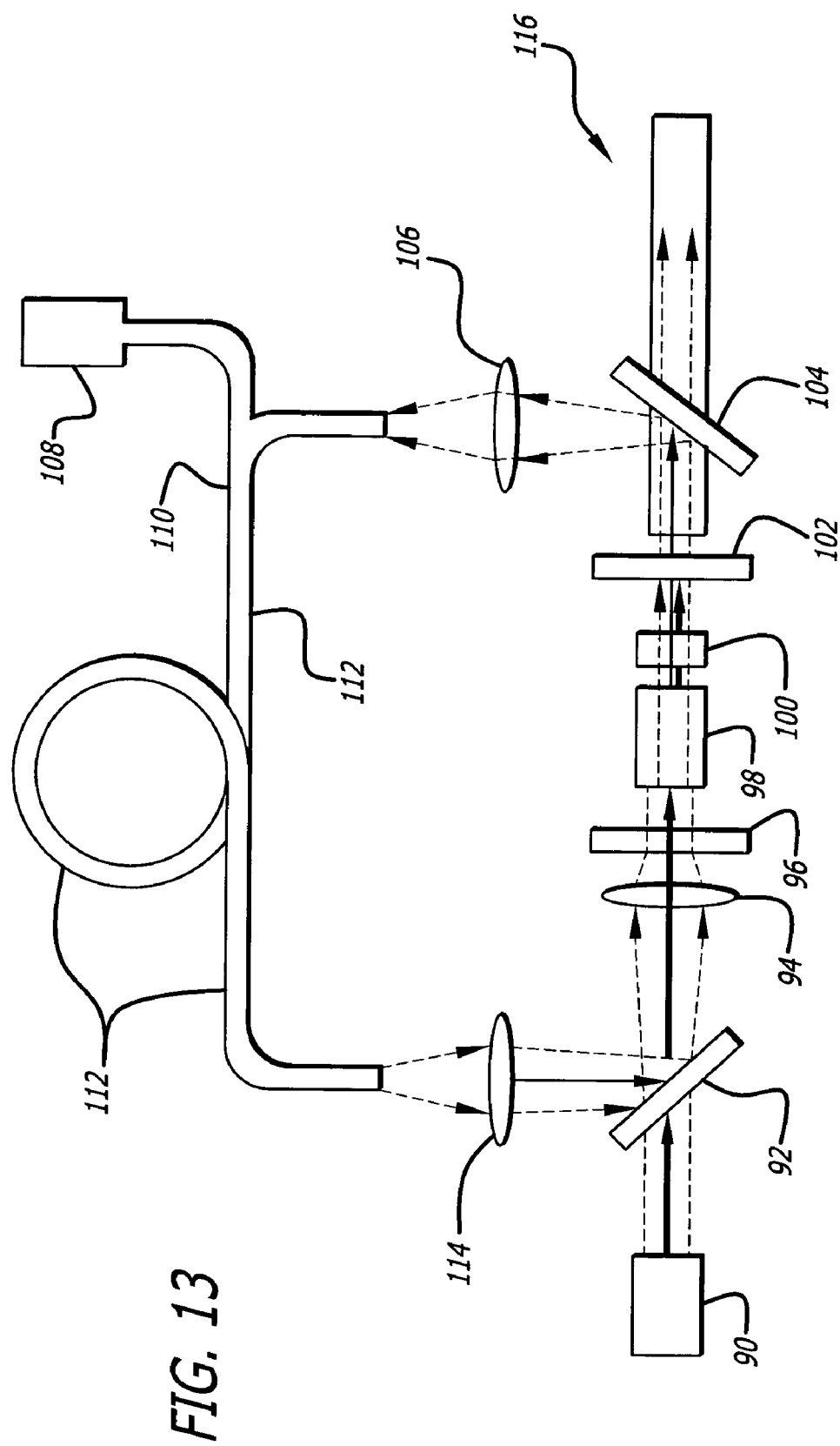
FIG. 13 is a diagram of a laser according to an illustrative embodiment of the present invention.

In the case where the erbium ions are pumped directly by both 1500 nanometer and 980 nanometer pumps, the structure of the laser in an illustrative embodiment of the present invention is illustrated in FIG. 13. This approach differs in the requirement to extend the duration of the interplay with the 980 nanometer pump. A pump re-capture scheme effectively lengthens the 980 nanometer pump. The 1540 nanometer pump 90 is end-coupled to the lasing medium 98 through a beam splitter 92, a lens 94, and a dielectric transmitter/reflector 96. The beam splitter 92 is transmissive at 1540 nanometers and reflective at 970 nanometers. The dielectric transmitter/reflector 96 is transmissive at 1540 nanometers and reflective at the laser wavelength, 1640 nanometers. A Q-switch 100 is positioned at the exit end of the lasing medium 98, and operates in the manner described herein before. A second beam splitter 104 is positioned at the output end of the laser, and is transmissive at the laser wavelength 1640 nanometers and reflective at 970 nanometers. This allows the laser beam 116 to be emitted from the system. The 970 nanometer pump source 108 is coupled trough a fiber-optic directional coupler 110 to a multi-mode optical fiber 112 the coupled the pumplight energy through lens 114 to the first beam splitter 92. the 970 nanometer pumplight is thus coupled into the lasing medium 98. A portion of the 970 nanometer pumplight passes through the lasing medium 98 and redirected by the second beam splitter 104. It passes through lens 106 and back into the directional coupler 110, to be recirculated through the system to the lasing medium 98 again. This arrangement provides the extended contact for the 970 nanometer pumplight energy. Similarly, the recapture/recirculation of the 970 nanometer pump can also be achieved with an integrating cavity that captures the pump light and recirculates it through the gain-absorpbing medium many times.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser comprising:
   a medium doped with first ions that emit light at a laser wavelength as a result of the transition of electron energy from an upper energy level manifold to a lower energy level manifold;
   a first pumplight aligned to couple energy into said medium at a first wavelength that excites a first portion of said first ions into said upper energy level manifold; and a second pumplight aligned to couple energy into said medium at a second wavelength that excites a second portion of said first ions to a third energy level manifold, a fraction of which relax to said upper energy level manifold and thereby increase the total quantity of said first ions at said upper energy level manifold, increasing the energy emitted at said laser wavelength, wherein the energy coupled from said first pumplight and said second pumplight are synchronized in time.

2. The laser of claim 1 wherein said medium is a crystal.

3. The laser of claim 1 wherein said medium is selected from one of: $Sc_2SiO_7$; $Sc_2SiO_5$; $Y_2SiO_5$; $Ca_2Al_2SiO_7$; $Ca_2Ga_2SiO_5$; $YVO_4$, $BeAl_2O_4$, and similar materials including glasses.

4. The laser of claim 1 wherein said medium is yttrium-aluminum-garnet.

5. The laser of claim 1 wherein said first ions are erbium ions, and wherein said lower energy level manifold is the erbium $^4I_{15/2}$ manifold, said upper energy level manifold is the erbium $^4I_{13/2}$ manifold, and said third energy level manifold is the erbium $^4I_{11/2}$ manifold.

6. The laser of claim 5 wherein and said first wavelength is near 1540 nm, said second wavelength is near 980 nm and said laser wavelength is near 1640 nm.

7. The laser of claim 1 wherein said first pumplight is a light emitting diode array and said second pumplight is a erbium:fiber laser that emits energy at a wavelength near 980 nanometers.

8. The laser of claim 1 further comprising a Q-switch disposed at an end of said medium through which said emitted laser wavelength light exits said medium.

9. The laser of claim 1 wherein said first pumplight and said second pumplight energy coupling are synchronized such that they do not overlap in time.

10. The laser of claim 1 wherein said first pumplight couples energy at said first wavelength for approximately four milliseconds and said second pumplight subsequently couples energy at said second wavelength for approximately two milliseconds.

11. The laser of claim 1 further comprising second ions doped into said medium and wherein said second wavelength energy indirectly excites said second portion of said first ions by directly exciting a portion of said second ions to an increased energy level manifold that induces an inter-ionic energy transfer to said second portion of said first ions.

12. The laser of claim 11 wherein said first ions are erbium ions and said second ions are ytterbium ions.

13. The laser of claim 12 wherein said increased energy level manifold is the ytterbium $^2F_{5/2}$ manifold, said lower energy level manifold is the erbium $^4I_{15/2}$ manifold, said upper energy level manifold is the erbium $^4I_{13/2}$ manifold, and said third energy level manifold is the erbium $^4I_{11/2}$ manifold.

14. The laser of claim 12 wherein said first wavelength is near 1540 nm, said second wavelength is near 940 nm and said laser wavelength is near 1640 nm.

15. A laser comprising:

a medium formed from erbium ion doped yttrium-aluminum-garnet that emits laser light near 1640 nanometer wavelength as a result of the transition of electron energy from the erbium ion $^4I_{13/2}$ energy level manifold to the erbium ion $^4I_{15/2}$ energy level manifold;

a diode array pumplight aligned to couple energy near 1540 nanometer wavelength, for a first period of time that is approximately four milliseconds in duration, into said medium and thereby excite a first portion of said erbium ions into the erbium $^4I_{13/2}$ energy level manifold;

an erbium:fiber laser pumplight aligned to couple energy near 980 nanometers, for a subsequent period of time that is approximately two milliseconds in duration, into said medium and thereby excite a second portion of said erbium ions into the erbium ion $^4I_{11/2}$ energy level manifold, a fraction of which relax to the erbium ion $^4I_{13/2}$ energy level manifold and thereby increase the total quantity of said erbium ions at said $^4I_{13/2}$ manifold; and a Q-switch disposed at an end of said medium through which said emitted laser wavelength light exits said medium.

16. A laser comprising:

a medium formed from erbium ion and ytterbium ion doped yttrium-aluminum-garnet that emits laser light near 1640 nanometer wavelength as a result of the transition of electron energy from the erbium ion $^4I_{13/2}$ energy level manifold to the erbium ion $^4I_{15/2}$ energy level manifold;

a first diode array pumplight aligned to couple energy near 1540 nanometer wavelength, for a first period of time that is approximately four milliseconds in duration, into said medium and thereby excite a first portion of said erbium ions into the erbium $^4I_{13/2}$ energy level manifold;

a second diode array pumplight aligned to couple energy near 940 nanometers, for a subsequent period of time that is approximately two milliseconds in duration, into said medium and thereby excite a portion of said ytterbium ions into the ytterbium $^2F_{5/2}$ energy level manifold, which induces an inter-ionic energy transfer to the erbium ion $^4I_{11/2}$ manifold, a fraction of which relax to the erbium ion $^4I_{13/2}$ energy level manifold and thereby increase the total quantity of said erbium ions at said $^4I_{13/2}$ manifold; and a Q-switch disposed at an end of said medium through which said emitted laser wavelength light exits said medium.

17. A method of producing laser light in a laser having a medium doped with first ions that emit light at a laser wavelength as a result of the transition of electron energy from an upper energy level manifold to a lower energy level manifold, and having a first pumplight operable to output energy at a first wavelength, and a second pumplight operable to output energy at a second wavelength, the method comprising the steps of:

coupling energy at the first wavelength from the first pumplight into the medium, thereby exciting a first portion of the first ions into the upper energy level manifold;

coupling energy at the second wavelength from the second pumplight into the medium, thereby exciting a second portion of the first ions to a third energy level manifold, a fraction of which relax to said upper energy level manifold, thereby increasing the total quantity of the first ions at the upper energy level manifold, and increasing the energy emitted at said laser wavelength; and synchronizing the coupling of energy from the first pumplight and the second pumplight.

18. The method of claim 17 wherein the medium is a crystal.

19. The method of claim 17 wherein the medium is yttrium-aluminum-garnet.

20. The method of claim 17 wherein the first ions are erbium ions, and wherein the lower energy level manifold is the erbium $^4I_{15/2}$ manifold, the upper energy level manifold is the erbium $^4I_{13/2}$ manifold, and said third energy level manifold is the erbium $^4I_{11/2}$ manifold.

21. The method of claim 20 wherein the first wavelength is near 1540 nm the second wavelength is near 980 nm and the laser wavelength is near 1640 nm.

22. The method of claim 17 wherein the first pumplight is a light emitting diode array and the second pumplight is an erbium:fiber laser that emits energy at a wavelength near 980 nanometers.

23. The method of claim 17 wherein the laser further includes a Q-switch disposed at an end of the medium, further comprising the step of emitting the laser light through the Q-switch upon reaching the switching threshold of the Q-switch, thereby emitting a short pulse of laser light.

24. The method of claim 17 wherein said synchronizing step is accomplished such that the coupling of the first pumplight energy and the second pumplight energy do not overlap in time.

25. The method of claim 17 wherein the first pumplight couples energy at the first wavelength for approximately four milliseconds, and the second pumplight subsequently couples energy at the second wavelength for approximately two milliseconds.

26. The method of claim 17 wherein second ions are doped into the medium, further comprising the step of indirectly exciting the second portion of the first ions by directly exciting a portion of the second ions to an increased energy level manifold that induces an inter-ionic energy transfer to the second portion of the first ions.

27. The method of claim 26 wherein the first ions are erbium ions and the second ions are ytterbium ions.

28. The method of claim 27 wherein the increased energy level manifold is the ytterbium $^2F_{5/2}$ manifold, the lower energy level manifold is the erbium $^4I_{15/2}$ manifold, the upper energy level manifold is the erbium $^4I_{13/2}$ manifold, and the third energy level manifold is the erbium $^4I_{11/2}$ manifold.

29. The method of claim 27 wherein the first wavelength is near 1540_nm the second wavelength is near 940_nm and the laser wavelength is near 1640_nm.

30. A laser comprising:
a medium doped with first ions that emit light at a laser wavelength as a result of the transition of electron energy from an upper energy level manifold to a lower energy level manifold land second ions doped into said medium;
a first pumplight aligned to couple energy into said medium at a first wavelength that excites a first portion of said first ions into said upper energy level manifold; and
a second pumplight aligned to couple energy into said medium at a second wavelength that excites a second portion of said first ions to a third energy level manifold, a fraction of which relax to said upper energy level manifold and thereby increase the total quantity of said first ions at said upper energy level manifold, increasing the energy emitted at said laser wavelength,
wherein said second wavelength energy indirectly excites said second portion of said first ions by directly exciting a portion of said second ions to an increased energy level manifold that induces an inter-ionic energy transfer to said second portion of said first ions.

31. The laser of claim 30 wherein said medium is a crystal.

32. The laser of claim 30 wherein said medium is selected from one of: $Sc_2SiO_7$; $Sc_2SiO_5$; $Y_2SiO_5$; $Ca_2Al_2SiO_7$; $Ca_2Ga_2SiO_5$; $YVO_4$, $BeAl_2O_4$, and similar materials including glasses.

33. The laser of claim 30 wherein said medium is yttrium-aluminum-garnet.

34. The laser of claim 30 wherein said first ions are erbium ions, and wherein said lower energy level manifold is the erbium $^4I_{15/2}$ manifold, said upper energy level manifold is the erbium $^4I_{13/2}$ manifold, and said third energy level manifold is the erbium $^4I_{11/2}$ manifold.

35. The laser of claim 34 wherein and said first wavelength is near 1540 nm, said second wavelength is near 980 nm, and said laser wavelength is near 1640 nm.

36. The laser of claim 30 wherein said first pumplight is a light emitting diode array and said second pumplight is a erbium:fiber laser that emits energy at a wavelength near 980 nanometers.

37. The laser of claim 30 further comprising a Q-switch disposed at an end of said medium through which said emitted laser wavelength light exits said medium.

38. The laser of claim 30 wherein the energy coupled from said first pumplight and said second pumplight are synchronized in time.

39. The laser of claim 38 wherein said first pumplight and said second pumplight energy coupling are synchronized such that they do not overlap in time.

40. The laser of claim 30 wherein said first pumplight couples energy at said first wavelength for approximately four milliseconds and said second pumplight subsequently couples energy at said second wavelength for approximately two milliseconds.

41. The laser of claim 30 wherein said first ions are erbium ions and said second ions are ytterbium ions.

42. The laser of claim 41 wherein said increased energy level manifold is the ytterbium $^2F_{5/2}$ manifold, said lower energy level manifold is the erbium $^4I_{15/2}$ manifold, said upper energy level manifold is the erbium $^4I13/2$ manifold, and said third energy level manifold is the erbium $^4I_{11/2}$ manifold.

43. The laser of claim 41 wherein said first wavelength is near 1540 nm, said second wavelength is near 940 nm and said laser wavelength is near 1640 nm.

44. A method of producing laser light in a laser having a medium doped with first ions that emit light at a laser wavelength as a result of the transition of electron energy from an upper energy level manifold to a lower energy level manifold, and having a first pumplight operable to output energy at a first wavelength, and a second pumplight operable to output energy at a second wavelength, the method comprising the steps of:
coupling energy at the first wavelength from the first pump light into the medium, thereby exciting a first portion of the first ions into the upper energy level manifold;
coupling energy at the second wavelength from the second pumplight into the medium, thereby exciting a second portion of the first ions to a third energy level manifold, a fraction of which relax to said upper energy level manifold, thereby increasing the total quantity of the first ions at the upper energy level manifold, and increasing the energy emitted at said laser wavelength, and
indirectly exciting the second portion of the first ions by directly exciting a portion of second ions in the medium to an increased energy level manifold that induces an inter-ionic energy transfer to the second portion of the first ions.

45. The method of claim 44 wherein the medium is a crystal.

46. The method of claim 44 wherein the medium is yttrium-aluminum-garnet.

47. The method of claim 44 wherein the first ions are erbium ions, and wherein the lower energy level manifold is the erbium $^4I_{15/2}$ manifold the upper energy; level manifold is the erbium $^4I_{13/2}$ manifold, and said third energy level manifold is the erbium $^4I_{11/2}$ manifold.

48. The method of claim 47 wherein the first wavelength is near 1540 nm, the second wavelength is near 980 nm, and the laser wavelength is near 1640 nm.

49. The method of claim 44 wherein the first pumplight is a light emitting diode array and the second pumplight is an erbium:fiber laser that emits energy at a wavelength near 980 nanometers.

50. The method of claim 44 wherein the laser further includes a Q-switch disposed at an end of the medium, further comprising the step of emitting the laser light through the Q-switch upon reaching the switching threshold of the Q-switch, thereby emitting a short pulse of laser light.

51. The method of claim 44 further comprising the step of synchronizing the coupling of energy from the first pumplight and the second pumplight.

52. The method of claim 44 wherein said synchronizing step is accomplished such that the coupling of the first pumplight energy and the second pumplight energy do not overlap in time.

53. The method of claim 44 wherein the first pumplight couples energy at the first wavelength for approximately four milliseconds, and the second pumplight subsequently couples energy at the second wavelength for approximately two milliseconds.

54. The method of claim 44 wherein the first ions are erbium ions and the second ions are ytterbium ions.

55. The method of claim 54 wherein the increased energy level manifold is the ytterbium $^2F_{5/2}$ manifold, the lower energy level manifold is the erbium $^4I_{15/2}$ manifold the upper energy level manifold is the erbium $^4I_{13/2}$ manifold, and the third energy level manifold is the erbium $^4I_{11/2}$ manifold.

56. The method of claim 54 wherein the first wavelength is near 1540 nm, the second wavelength is near 940 nm and the laser wavelength is near 1640 nm.

* * * * *